United States Patent [19]

Tanaka et al.

[11] Patent Number: 5,536,528
[45] Date of Patent: Jul. 16, 1996

[54] METHOD AND APPARATUS FOR STRANDING TAPE-SHAPED OPTICAL FIBERS

[75] Inventors: Takashi Tanaka; Kazuhiro Hamada; Shigeru Suemori; Takehiko Okada, all of Kanagawa, Japan

[73] Assignee: Sumitomo Electric Industries, Ltd., Japan

[21] Appl. No.: 280,186

[22] Filed: Jul. 25, 1994

[30] Foreign Application Priority Data

Jul. 26, 1993 [JP] Japan .................................. 5-204564

[51] Int. Cl.$^6$ ........................ H01B 13/02; H01B 13/32; G02B 6/44
[52] U.S. Cl. ................. 427/163.2; 156/48; 385/103; 385/110; 385/113; 427/185; 427/194
[58] Field of Search .................... 385/113, 110, 385/103; 427/185, 194, 163.2; 264/1.28; 156/48, 172

[56] References Cited

U.S. PATENT DOCUMENTS

| 4,265,686 | 5/1981 | Garner ................................ 156/48 |
| 4,401,366 | 8/1983 | Hope .............................. 385/113 X |
| 4,701,015 | 10/1987 | Saito . | |
| 4,741,918 | 5/1988 | Nagy de Nagybaczon et al. .. 427/194 X |
| 4,985,185 | 1/1991 | Mayr ................................ 156/48 X |
| 4,997,258 | 3/1991 | Oestreich ........................... 264/1.28 X |
| 5,199,094 | 3/1993 | Schneider ........................ 427/163.2 X |

FOREIGN PATENT DOCUMENTS

| 0256558 | 2/1988 | European Pat. Off. . |
| 64-36811 | 3/1989 | Japan . |
| 3200103 | 9/1991 | Japan . |
| 4214511 | 8/1992 | Japan . |

*Primary Examiner*—Jeff H. Aftergut
*Attorney, Agent, or Firm*—Cushman Darby & Cushman

[57] ABSTRACT

A method and apparatus for stranding tape-shaped optical fibers of the present invention strands a plurality of tape-shaped optical fibers each of which is constituted by a plurality of optical fibers arranged into a tape-shaped unit, wherein powder is applied onto at least one surface of each of said tape-shaped optical fibers in pathlines between supplying devices for supplying said tape-shaped optical fibers and a stranding die of said tape-shaped optical fibers.

15 Claims, 3 Drawing Sheets

METHOD AND APPARATUS FOR STRANDING TAPE-SHAPED OPTICAL FIBERS

BACKGROUND OF THE INVENTION

1. Field of the Invention

The present invention relates to a method and apparatus for stranding tape-shaped optical fibers in lamination each of which includes a plurality of optical fibers arranges into a tape-shaped optical fiber.

2. Description of the Related Art

FIG. 4 is a cross section showing an example of a tape-shaped optical fiber. In FIG. 4, the tape-shaped optical fiber 1 includes a plurality of coated optical fibers 2 which are arranged in parallel to each other and the whole outside of which are covered with a coating layer 3 so that the coated optical fibers 2 are integrated into a unit as a tape-shaped optical fiber. Generally, an UV cure acrylate resin is used as the coating layer 3.

FIG. 5 is a cross section of an example of a slot cable using the tape-shaped optical fibers as mentioned above. As shown in the drawing, the optical cable includes a slotted spacer 4 having a tensile member 5 at central position thereof and a plurality of optical fiber storing slots 6A, 6B, 6C and 6D which are spiral grooves at its circumference. In each of the optical fiber storing slots 6A, 6B, 6C and 6D, a plurality of tape-shaped optical fibers 1 are stranded and stored in lamination. The outer circumference of the slotted spacer 4 is covered with an wrapping tape 7, and the outer circumference of the wrapping tape 7 is further covered with an outer sheath 8 of polyvinyl chloride, polyethylene, or the like.

When a plurality of tape-shaped optical fibers are stranded in lamination as described above, proper excess length cannot be given to the tape-shaped optical fibers because of the high friction coefficient between the respective UV cure acrylate resins applied to the outsides thereof. For such a reason, the transmission loss of the optical fibers become abnormal, and in the case where a cable is bent after the constitution thereof, the tape-shaped optical fibers become difficult to move after the stranding so that the tape-shaped optical fiber located on the outside of the bending is subjected to strain beyond an allowable limit. Accordingly, the reliability is deteriorated and particularly the lifetime till break is shortened. Therefore, in order to reduce the friction between the tape-shaped optical fibers, generally, powder, such as talc powder, or the like, giving sliding property is applied to the tape-shaped optical fibers.

It has been general conventionally that such powder was applied in a period from the formation of tape-shaped optical fibers to the taking up of the tape-shaped optical fibers onto bobbins or the like in the tape-shaped optical fiber manufacturing process or applied while the tape-shaped optical fibers were wound up again in a separate step after production of the tape-shaped optical fibers.

In such a conventional powder application method as mentioned above, the friction coefficient between the tape-shaped optical fibers becomes low by the application of the powder. Accordingly, in carrying the tape-shaped optical fibers after wound-up into a stranding step, stranding the tape-shaped optical fibers or the like, the tape-shaped optical fibers may easily get out of their winding shape in winding up of the tape-shaped optical fibers onto bobbins or the like after application of powder. Further, proper tension control thereof becomes difficult in the stranding of the tape-shaped optical fibers or the tape-shaped optical fibers, and the tape-shaped optical fibers become impossible to be fed out because getting out of their winding shape so that they may be broken.

Further, as for the conventional method or apparatus for applying powder to the tape-shaped optical fibers, it is difficult to apply the powder uniformly in the longitudinal direction of the tape-shaped optical fibers, because the tape-shaped optical fibers are simply passed through the powder. If the powder does not apply-uniformly on the surface of the tape-shaped optical fiber, the frictional coefficients of the tape-shaped optical fiber become different at various portions thereof. Accordingly, when the optical cable in which a plurality of tape-shaped optical fibers are stored in the slots is bent, some of the tape-shaped optical fibers may be undulated in the slots.

SUMMARY OF THE INVENTION

In order to solve the problems-in the conventional method and apparatus, it is an object to provide a method and apparatus of stranding of tape-shaped optical fibers in which powder is applied to the tape-shaped optical fibers uniformly in the longitudinal direction while the tape-shaped optical fibers do not get out of their winding shape in spite of application of the powder.

In order to attain the above objects, a method of present invention for stranding tape-shaped optical fibers comprises the steps of: supplying a plurality of tape-shaped optical fibers each of which is constituted by a plurality of optical fibers arranged into a tape-shaped unit; simultaneously supplying a stranding member for stranding the plurality of tape-shaped optical fibers thereinto in lamination; applying powder onto at least one surface of each of the tape-shaped optical fibers; and stranding the plurality of tape-shaped optical fibers into said stranding member in lamination.

Further, an tape-shaped optical fiber stranding apparatus of the present invention comprises: tape-shaped optical fiber supplying device for supplying a plurality of tape-shaped optical fiber; stranding member supplying device for supplying a stranding member having a plurality of slots in each of which the tape-shaped optical fibers are stored in lamination; stranding die for stranding the tape-shaped optical fibers and the stranding member; and powder applying device, which is provided between the tape-shaped optical fiber supplying device and the stranding die, for applying powder onto at least one surface of each of the tape-shaped optical fibers.

In the above-mentioned tape-shaped optical fiber stranding apparatus and method according to the present invention, powder is applied immediately before the stranding die and moreover in the pathlines between the tape-shaped optical fiber supplying devices and the stranding die. Accordingly, conventional problems such as improper tape-shaped optical fiber feed tension control due to getting out of their winding shape, breaking due to impossibility of paying off, etc., can be prevented from occurring.

Further, in the method and apparatus, powder is applied to the tape-shaped optical fibers while the powder is being fluidized by gas or powder is applied to the tape-shaped optical fibers while a powder transfer roller is brought into contact with the tape-shaped optical fibers so as to apply the powder onto the surfaces of the tape-shaped optical fibers. Accordingly, a fixed quantity of powder can be always applied onto the surfaces of the tape-shaped optical fibers so that it becomes possible to apply the powder uniformly in the longitudinal direction.

DETAILED DESCRIPTION OF THE PREFERRED EMBODIMENTS

Figure 1:
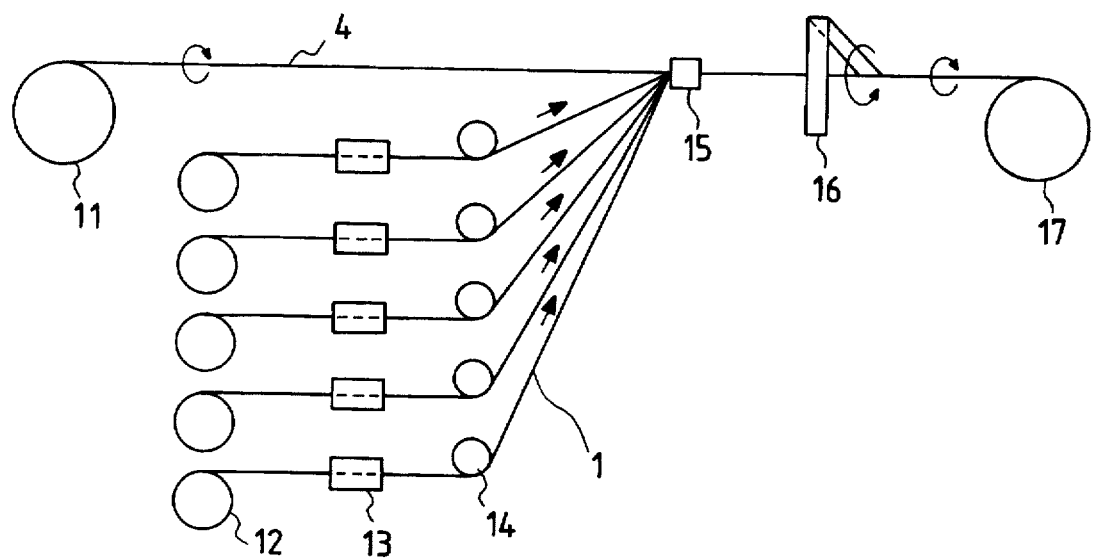
FIG. 1 is an explanatory diagram of an embodiment of a stranding apparatus of tape-shaped optical fibers of the present invention.

FIG. 1 is an explanatory diagram of an embodiment of a stranding apparatus of tape-shaped optical fibers according to the present invention.

In the drawing, the stranding apparatus includes a spacer supplying device 11 for supplying a slotted spacer 4 having a plurality of optical fiber storing slots formed in the outer circumference of the spacer 4, each of tape-shaped fiber supplying devices 12 for supplying a tape-shaped optical fiber 1 including a plurality of coated optical fibers being arranged into a tape-shaped unit, powder application devices 13A each of which is provided in respective pathlines of the tape-shaped optical fibers between the respective tape-shaped fiber supplying device 12 and a stranding die 15, guide rollers 14, the stranding die 15, an upper-wrapping 18 and a take-up dram 17. In such an apparatus, the tape-shaped optical fibers 1 and the spacer 4 are stranded in the following method.

The tape-shaped optical fibers 1 supplied from the respective tape-shaped optical fiber supplying devices 12 reach the stranding die 15 through the guide rollers 14 so that the tape-shaped optical fibers 1 are stranded in lamination thereat and stored respectively into the optical fiber storing slots of the slotted spacer 4 supplied from the spacer supplying device 11. Thereafter, an wrapping tape 16 is wound over the outside of the slotted spacer 4 provided with the tape-shaped optical fibers 1 by a wrapping device 18, and the slotted spacer 4 wrapped with tape 16 is take up by a take-up drum 17. In the stranding method, powder application devices 13A are provided in pathlines from the respective tape-shaped optical fiber supplying devices 12 to the stranding die 15 so that the tape-shaped optical fibers 1 at least one surfaces of which is applied with powder by the devices 13A are stranded at the stranding die 15.

Figure 2:
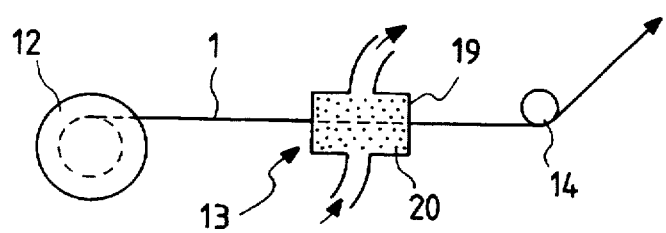
FIG. 2 is an explanatory diagram of an embodiment of the powder application device of the present invention.

FIG. 2 is an explanatory diagram of an embodiment of the above-mentioned powder application device. The powder application device 13A includes an application tank 19A provided in the pathline of the tape-shaped optical fiber 1. Gas 21 is blown into the application tank 19A to thereby fluidize the powder 20 in the application tank 19A so as to apply the powder 20 onto the surface of the tape-shaped optical fiber 1 which passes through the application tank. Thus, the powder 20 can be applied onto the tape-shaped optical fiber 1 stably and uniformly in the longitudinal direction of the tape-shaped optical fiber 1.

Figure 3:
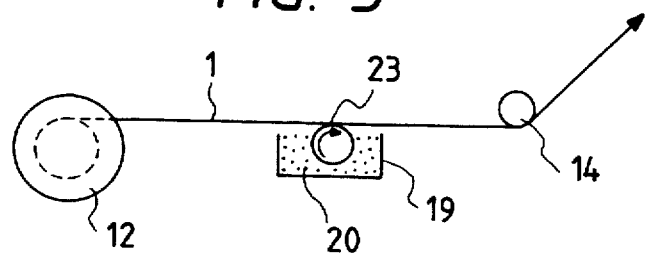
FIG. 3 is an explanatory diagram of another embodiment of the powder application device of the present invention.
Figure 4:
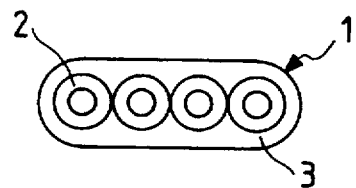
FIG. 4 is a cross section of an example of the tape-shaped optical fiber.

FIG. 3 is an explanatory diagram of another embodiment of the powder application device. The powder application device 13A includes an application tank 19B provided in the pathline of the tape-shaped optical fiber 1 and a powder transfer roller 23 provided therein. The roller 23 is contacted with the tape-shaped optical fiber 1 which passes through the application tank 19 so as to apply powder 20 onto the surface of the tape-shaped optical fiber 1.

Figure 6:
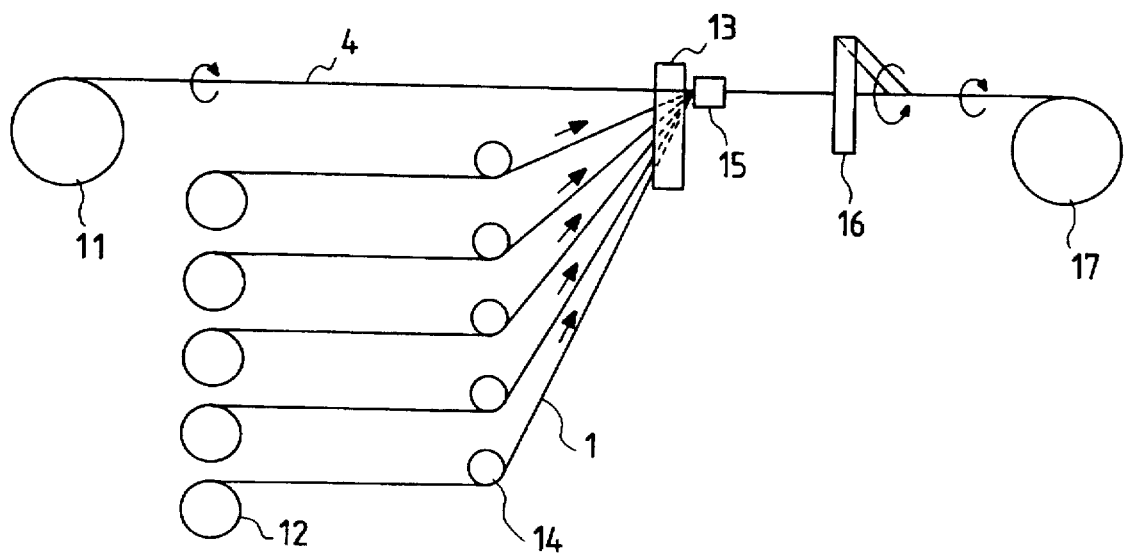
FIG. 6 is an explanatory diagram of another embodiment of the stranding apparatus of the tape-shaped optical fibers of the present invention.

FIG. 6 is an explanatory diagram of another embodiment of the device of stranding of tape-shaped optical fibers according to the present invention.

In the apparatus as shown in FIG. 1, the powder application devices 13A are provided in the pathlines of the respective tape-shaped optical fibers 1 so that the powder is applied to each of the tape-shaped optical fibers 1 individually. On the other hand, in this embodiment as shown in FIG. 6, only one powder application device 13B is provided commonly in the pathlines immediately before the stranding die 15 so that powder is applied onto at least one surfaces of the respective tape-shaped optical fibers 1 at only one position, and then the tape-shaped optical fibers 1 are stranded in lamination at the stranding die 15.

Figure 7:
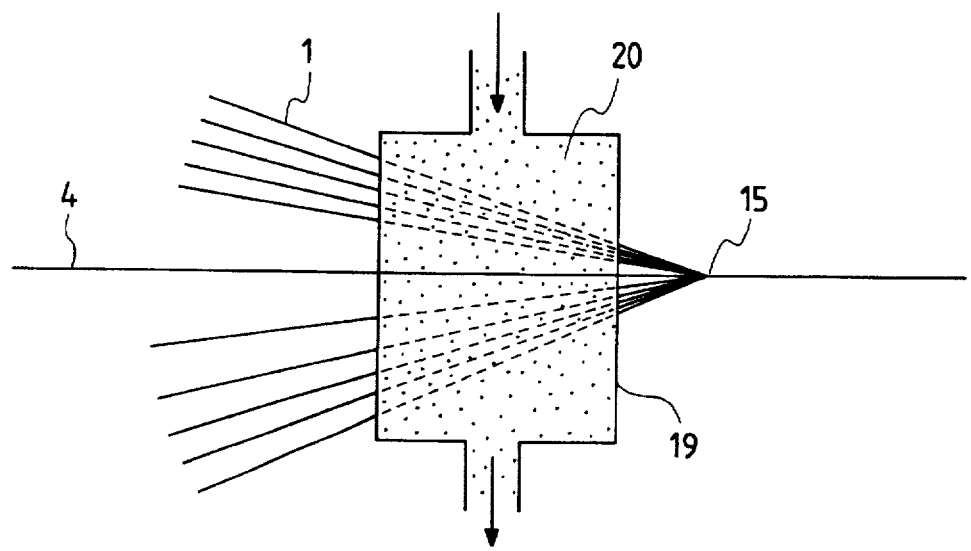
FIG. 7 is an explanatory diagram of another embodiment of the powder application device.

FIG. 7 is an explanatory diagram of an embodiment of the powder application device which is used in the apparatus as shown in FIG. 6. The powder application device 13B includes an application tank 19C which is provided immediately before the stranding die 15. Powder is introduced compressedly into the application tank 19C through an inlet on one side and sucked out from an outlet at the other side so that the powder is fluidized and applied onto the surface of the tape-shaped optical fibers 1. Thus, the powder can be applied onto the tape-shaped optical fibers 1 stably and uniformly in the longitudinal direction of the tape-shaped optical fibers 1.

Figure 8:
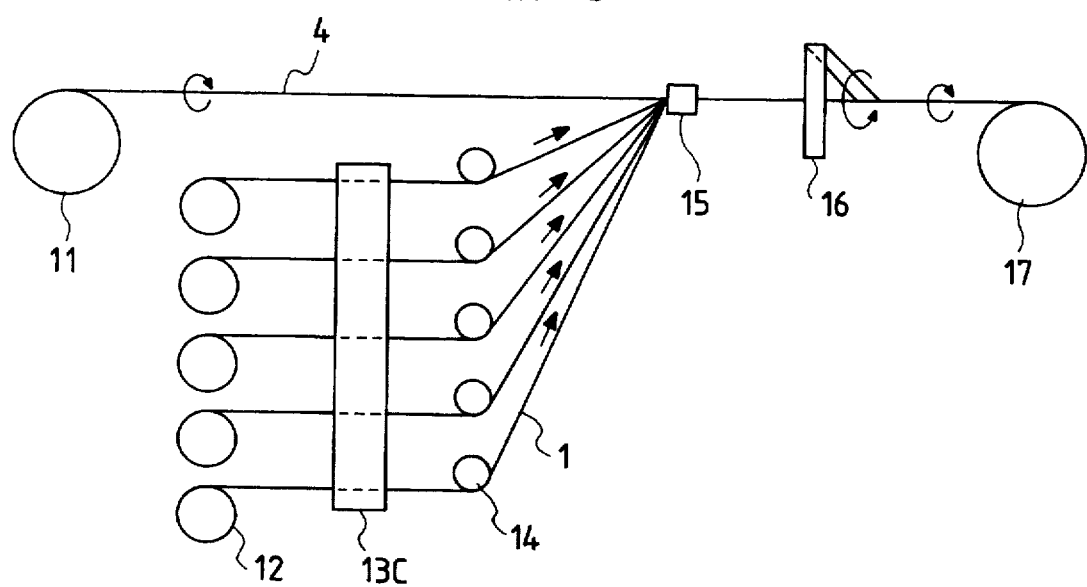
FIG. 8 is an explanatory diagram of another embodiment of the apparatus.

The powder application device may be provided everywhere between respective tape-shaped optical fiber supplying devices and the stranding die. For example, as shown in FIG. 8, only one powder application device 13C is provided between the tape-shaped optical fiber supplying devices 12 and the guide rollers 14 so that the application device 13C can apply the powder onto the surface of all of the tape-shaped optical fibers at a time. Further, only one application device or plurality of the application devices which correspond to the respective tape-shaped optical fiber can be provided between the guide roller 14 and the stranding point 15 without applying the powder on the slotted spacer 4.

EXAMPLE

Figure 5:
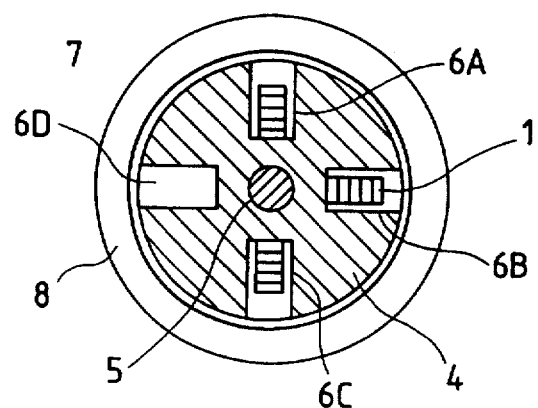
FIG. 5 is a cross section of an example of a slot cable.

In order to prove the effects of the present invention, tape-slot type optical cables as shown in FIG. 5 were produced as examples.

The cable was prepared in the following manner. In first slot (spiral groove) 6A, five tape-shaped optical fibers to which talc powder was applied in advance in the step of manufacturing the tape-shaped optical fibers were laminated and stored. In second slot 6B, laminated and stored were five tape-shaped optical fibers to which the talc powder was applied from talc powder application tanks provided in the pathlines in which air was blown into the tanks to fluidize the powder. In third slot 6C, laminated and stored were five tape-shaped optical fibers optical fibers to which the talc powder was applied from the talc powder transfer rollers provided in the pathlines and the transfer rollers were contacted with the tape-shaped optical fibers to thereby apply the powder onto only one surfaces of the tape-shaped optical fibers. The tape-shaped optical fibers were stranded by 12000 m with the pitch, which is a spiral cycle, of 500 mm, and after application of the upper wrapping tape, a 2 mm thick polyethylene sheath was applied.

As the talc, Micro-ace produced by Japan Talc Co., Ltd. was used. Compressed air of 2.5 kg/cm$^2$ was fed into the talc tanks so as to fluidize the talc powder. As the talc powder transfer rollers, bakelite rollers of $\phi$100 mm were used.

Evaluation was preformed by inspecting as to whether the tape-shaped optical fibers in stranding operation went out of their winding shape or not, and by measuring bending strain by a phase method in a state in which after production of a cable, the opposite end cores of the outermost one of the tape-shaped optical fibers of the cable when the cable was bent along a $\phi$600 mm mandrel were fused and connected to each other into a loop.

Of the tape-shaped optical fibers stored in the first slot 6A, the tape-shaped optical fiber which was a subject to be measured by the phase method went out of their winding shape at a position of 7600 m from the start of winding so that continuation of stranding became impossible and the tape-shaped optical fiber was cut off unavoidably. With respect to the second and third slots 6B and 6C, however, all the tape-shaped optical fibers did not get out of their winding shape and other problems did not occur in the stranding operation of 12000 m so that stranding could be completed.

After application polyethylene sheath, five sample points were taken at random and the bending strain was measured at the sample points by the above-mentioned method. The results of the measured bending strain (%) are shown in Table 1.

TABLE 1

| Sample No. | First Slot (%) | Second Slot (%) | Third Slot (%) |
| --- | --- | --- | --- |
| 1 | 0.19 | 0.18 | 0.19 |
| 2 | 0.24 | 0.20 | 0.20 |
| 3 | 0.19 | 0.19 | 0.20 |
| 4 | 0.25 | 0.19 | 0.21 |
| 5 | 0.22 | 0.20 | 0.19 |
| Average | 0.218 | 0.194 | 0.198 |
| difference between max. and min. | 0.06 | 0.02 | 0.02 |

With respect to the tape-shaped optical fibers stored in the second and third slots 6B and 6C to which the present invention were applied, the average of measured values of the bending strain was low and the deviation of the measured values was less. Namely, the tape-shaped fibers to which the present invention was applied were applied the powder on its surfaces uniformer than that to which the conventional method was applied. Further, it is difficult that the tape-shaped optical fiber located on the outside of the bending is subjected to strain beyond an allowable limit. Accordingly, it was confirmed that those tape-shaped optical fibers received in the second and third slots 6B and 6C were superior in comparison with those received in the first slot 6A to which the conventional method was applied.

As described above, according to the tape-shaped optical fiber stranding apparatus and method of the present invention, conventional problems such as improper tape-shaped optical fiber feed tension control due to getting out of their winding shape, breaking due to impossibility of paying off, etc., can be prevented from occurring, and the method is very effective it is us utilized for stranding of tape-shaped optical fibers of slot cables, or the like.

What is claimed is:

1. A method for stranding tape-shaped optical fibers, comprising the step of:

stranding a plurality of tape-shaped optical fibers in layers, each of said tape-shaped optical fibers being constituted by a plurality of optical fibers arranged into a tape-shaped unit;

wherein powder is applied onto at least one surface of each of said tape-shaped optical fibers in pathlines between supplying devices for supplying said tape-shaped optical fibers and a stranding die of said tape-shaped optical fibers; and wherein an application tank in which said powder is stored is provided just before said stranding die, and gas is blown into said application tank to fluidize said powder to apply said powder onto respective surfaces of all of said tape-shaped optical fibers which is passed through said application tank.

2. A method for stranding tape-shaped optical fibers according to claim 1, wherein an application tank in which said powder is stored is provided on each of said pathlines, and gas is blown into said application tank to fluidize said powder to apply said powder onto surfaces of each of said tape-shaped optical fibers which is passed through said application tank.

3. A method for stranding tape-shaped optical fibers comprising the step of:

stranding a plurality of tape-shaped optical fibers in layers, each of said tape-shaped optical fibers being constituted by a plurality of optical fibers arranged into a tape-shaped unit;

wherein powder is applied onto at least one surface of each of said tape-shaped optical fibers in pathlines between supplying devices for supplying said tape-shaped optical fibers and a stranding die of said tape-shaped optical fibers; and wherein a transfer roller for transferring said powder onto at least one surface of each of said taped-shaped optical fiber is provided on each of said pathlines, and said transfer roller is contacted with said optical fiber to apply said powder onto said optical fiber.

4. A method for stranding tape-shaped optical fibers comprising the steps of:

supplying a plurality of tape-shaped optical fibers each of which is constituted by a plurality of optical fibers arranged into a tape-shaped unit;

simultaneously supply a stranding member for stranding said plurality of tape-shaped optical fibers thereinto in layers;

applying powder onto at least one surface of each of said tape-shaped optical fibers; and stranding said plurality of tape-shaped optical fibers into said stranding member in layers, wherein said applying step comprises blowing gas into at least one application tank to fluidize said powder, and applying said fluidized powder onto surfaces of said plurality of tape-shaped optical fibers.

5. A method for stranding tape-shaped optical fibers according to claim 4, wherein said applying step is performed after said tape-shaped optical fibers supplying step and before said stranding step.

6. A method for stranding tape-shaped optical fibers according to claim 4, wherein each of said plurality of tape-shaped optical fibers is applied said powder by respective application tanks.

7. A method for stranding tape-shaped optical fibers according to claim 4, wherein said plurality of tape-shaped optical fibers are applied said powder by one application tank.

8. A method for stranding tape-shaped optical fibers according to claim 4, wherein said stranding member has a plurality of slots so that said plurality of tape-shaped optical fibers are stored into said slots in layers.

9. A method for stranding tape-shaped optical fibers, comprising the steps of:

supplying a plurality of tape-shaped optical fibers each of which is constituted by a plurality of optical fibers arranged into a tape-shaped unit;

simultaneously supply a stranding member for stranding said plurality of tape-shaped optical fibers thereinto in layers;

applying powder onto at least one surface of each of said tape-shaped optical fibers; and stranding said plurality of tape-shaped optical fibers into said stranding member in layers, wherein said applying step comprises bringing powder transfer rollers, which transfer said powder to said tape-shaped optical fibers, into contact with said tape-shaped optical fibers, and applying said powder onto surface of each of said plurality of tape-shaped optical fibers by respective said transfer rollers.

10. A tape-shaped optical fiber stranding apparatus comprising:

tape-shaped optical fiber supplying means for supplying a plurality of tape-shaped optical fiber;

stranding member supplying means for supplying a stranding member having a plurality of slots in each of which said tape-shaped optical fibers are stored in layers;

stranding means for stranding said tape-shaped optical fibers and said stranding member; and powder applying means, which is provided between said tape-shaped optical fiber supplying means and said stranding means, for applying powder onto at least one surface of each of said tape-shaped optical fibers, wherein said powder applying means comprises an applying tank and fluidization means for blowing gas into said applying tank to fluidize said powder to apply said powder onto at least one surface of said tape-shaped optical fiber.

11. A tape-shaped optical fiber stranding apparatus according to claim 10, wherein said powder applying means is provided just before said stranding means and said powder applying means applies said powder to said plurality of optical fibers.

12. A tape-shaped optical fiber stranding apparatus according to claim 10, wherein said powder applying means is provided in each of pathlines of said plurality of optical fibers.

13. A tape-shaped optical fiber stranding apparatus according to claim 10, further comprising:

wrapping means for wrapping said stranding member with a tape in which said tape-shaped optical fibers are stored in layers; and take-up means for taking up said wrapped stranding member.

14. A tape-shaped optical fiber stranding apparatus comprising:

tape-shaped optical fiber supplying means for supplying a plurality of tape-shaped optical fiber;

stranding member supplying means for supplying a stranding member having a plurality of slots in each of which said tape-shaped optical fibers are stored in layers;

stranding means for stranding said tape-shaped optical fibers and said stranding member; and powder applying means, which is provided between said tape-shaped optical fiber supplying means and said stranding means, for applying powder onto at least one surface of each of said tape-shaped optical fibers, wherein said powder applying means comprises a transfer roller for carrying said powder, which contacts said tape-shaped optical fiber to apply said powder onto at least one surface of said tape-shaped optical fiber.

15. A tape-shaped optical fiber stranding apparatus according to claim 14, wherein said powder applying means is provided in each of pathlines of said plurality of optical fibers.

* * * * *